Oct. 20, 1959  J. W. COLVIN  2,909,243
WHEEL BRAKE ARRANGEMENT FOR AIRCRAFT LANDING GEAR
Filed Dec. 5, 1955  2 Sheets-Sheet 2

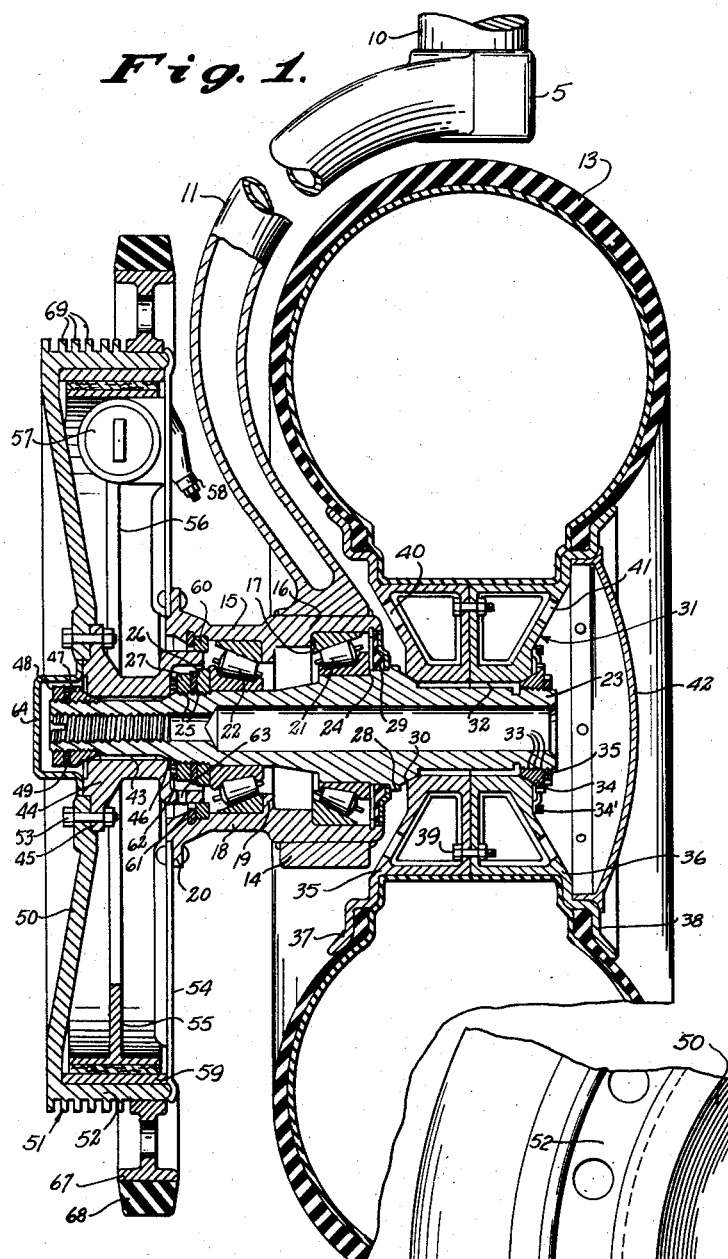

INVENTOR.
JAMES W. COLVIN

United States Patent Office 2,909,243
Patented Oct. 20, 1959

2,909,243

WHEEL BRAKE ARRANGEMENT FOR AIRCRAFT LANDING GEAR

James W. Colvin, Williamsburg, Va.

Application December 5, 1955, Serial No. 550,929

12 Claims. (Cl. 188—2)

This invention relates to improvements in aircraft landing gear and particularly to an improved landing gear wheel and brake arrangement.

In the past landing gear struts for larger airplanes have been provided in the form of forks or U shaped members having two leg portions attached, one to each end of the wheel axle. This type of strut is well exemplified by that used on the Douglas DC-3 commercial airplane.

This type of strut was found unsatisfactory for various reasons but particularly because it made it extremely difficult to change a landing wheel tire. In order to change a tire on a wheel carried by this type of strut it is necessary to remove the wheel axle, disconnect the brake hydraulic line and remove the entire wheel and brake assembly from the airplane landing gear mechanism. The complete fork construction does, however, have the advantage of applying the loads to both ends of the wheel axle so that bending loads on the axle itself are not excessive. In order to avoid the above described tire changing difficulties and related disadvantages the aircraft industry has recently developed a single arm type of landing gear strut connected to one end of the axle only as is particularly exemplified by the landing gear construction on the Curtis "Commando" or C-46.

While this type of landing gear materially simplified the tire changing operation it has introduced other difficulties for which no satisfactory solution has been found up to the time of the present invention.

In the single arm strut landing gear assemblies a drum type brake is disposed between the wheel and the strut arm with the drum secured to the wheel and the shoe supporting spider or backing plate secured to the strut arm. In such an arrangement the wheel axle acts as a cantilever beam and is unduly elongated, not only by reason of the necessary thickness of the wheel hub, but also because of the necessity of providing space for the brake between the wheel and the strut arm. This arrangement permits the axle to flex or bend excessively under load. As the brake drum is carried by the wheel while the brake shoes are carried by the strut arm, when the axle bends under load, the drum is skewed relative to the shoes has a tendency to wobble relative to the shoes. In large brakes such as are used on the Curtis C-46 the drum at times is out of line with the shoes by as much as one-eighth inch across the width of the shoe so that the only frictional contact between the drum and the brake lining is along the edges of the lining. This results in excessive wear of the brake parts and necessitates a complete brake overhaul after a few landings of the airplane.

The location of the brakes within the overhang of the pneumatic tires also shrouds the brakes to such an extent that the maximum ventilation is not possible, frequently resulting in excessive operating temperatures.

The space limitations have also necessitated the use of brakes of inadequate size which has increased the tendency for the brakes to overheat and wear out far short of a satisfactory service life.

It is therefore among the objects of the present invention to provide a landing gear construction using a single strut arm to facilitate rapid changing of the tires but in which the brake parts are maintained in proper alignment and the axles are relieved of excessive bending forces.

A further object resides in the provision of an improved landing gear construction wherein the brake is so disposed that it is completely ventilated and may be made of adequate size to efficiently handle the loads to which it is subjected without overheating or excessive wear.

A still further object resides in the provision of an improved retractible landing gear construction having a single arm strut and cantilever wheel axle and a drum type brake so disposed that the operative alignment of its parts is not materially affected by load induced distortions of the axle and does not cause any interference in retracting the brake and associated wheel into a wing recess.

An additional object resides in the provision of an improved landing gear construction in which the wheels may be removed and replaced without disturbing the wheel bearings and in which the two parts of a divided wheel may be held together in operative assembly by a single nut associated with the wheel axle.

Another object resides in the provision of an improved landing gear construction in which a light weight emergency landing wheel may be associated with a brake mechanism to assist in supporting the landing loads in case the associated tire has insufficient air pressure for that purpose, to thereby prevent destruction of the tire and minimize the hazard of landing an airplane with a soft or deflated landing wheel tire.

Other objects and advantages will become apparent as the description proceeds in connection with accompanying drawings in which:

In the drawings—

Fig. 1 is a transverse sectional view of a landing wheel and brake arrangement illustrative of the invention;

Fig. 2 is an elevation of a fragmentary portion of the wheel illustrated in Fig. 1, looking from the left hand side of Fig. 1;

Fig. 4 is an elevational view of a jack pad which may be used with the arrangement illustrated in Fig. 1.

Figures 3, 5:
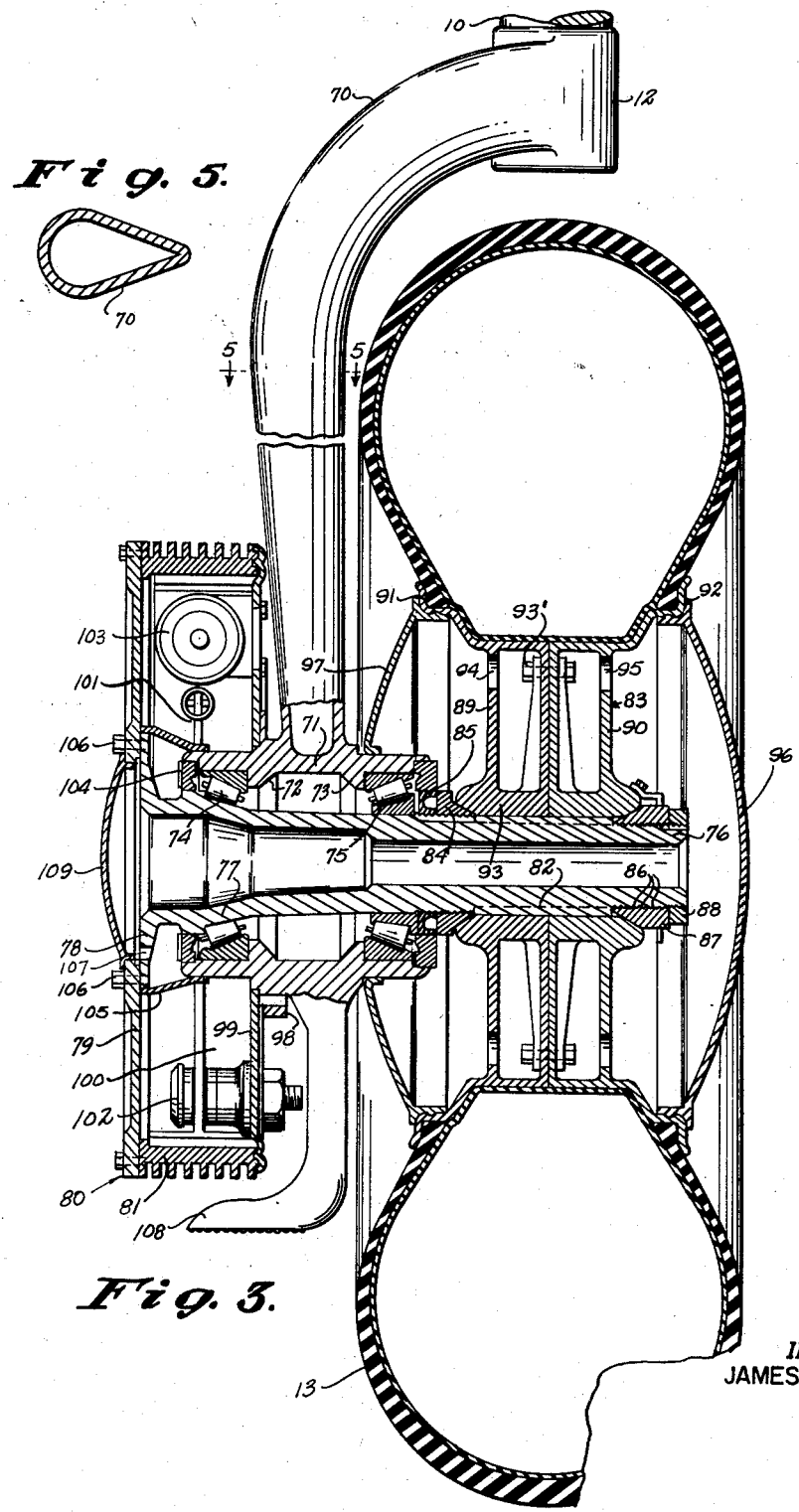
Fig. 3 is a transverse sectional view of a modified form of the invention.
Fig. 5 is a transverse cross section on the line 5—5 of Fig. 3.

With continued reference to the drawings and particularly to Fig. 1, a leg or strut member 10 depends from a fixed portion of the airplane structure and constitutes the lower part of a shock strut, such as are commonly used in aircraft landing gears.

For example, in a Curtis C-46 type airplane the member 10 is telescopically received in a tubular member which is hinged to the structure of the airplane wing so that the landing gear may be retracted while the airplane is in flight. Suitable hydraulically damped spring cushion means are incorporated between the member 10 and the tubular member in which it is telescopically received in order to provide a shock absorbing effect for the landing wheel. As this portion of the landing gear may be conventional a further description is thought to be unnecessary for the purpose of this disclosure.

A wheel attaching strut or arm 11 is connected at its upper end to the lower end of the shock strut member 10 by suitable means, such as the housing 5 surrounding and secured to the lower end of the member 10. The arm 11 is tubular and is preferably curved to fit closely about the inner side of the landing wheel tire 13. At its lower end the arm 11 is rigidly secured to or formed integrally with a cylindrical ring or receptacle 14 which receives the journal sleeve 15. The journal sleeve 15 comprises a cylindrical portion 16 having an internal radial shoulder 17, a reduced cylindrical portion 18 having an internal collar or annular rib 19 at the end thereof joining the adjacent end of the portion 16, and an external radial flange 20 at its end opposite the cylindrical portion 16.

An antifriction roller bearing 21 is received in the end of the portion 16 with its outer race bearing against the shoulder 17 and a second antifriction bearing 22 is received in the reduced portion 18 with its outer race abutting the side of the annular collar 19 opposite the shoulder 17.

A tubular axle 23 is journalled in the cylindrical sleeve 15 by the antifriction bearings 21 and 22. This axle has a radial shoulder 24 bearing against the inner race of the antifriction bearing 21 and has a screw threaded portion 25 upon which are threaded a nut 26 and a lock nut 27. The nut 26 bears against the inner race of the bearing 22 and when this nut is tightened on the axle the inner races of the two bearings 21 and 22 are forced toward each other until a bearing pressure is produced which preloads the two bearings 21 and 22 to a desired amount so that the axle 23 is firmly maintained in a concentric condition relative to the sleeve 15 and is also firmly held against end play relative to the sleeve.

An annular external bead 28 on the axle adjacent to the radial shoulder 24 provides a support for an oil seal 29 which extends between the axle and a lip at the open end of sleeve portion 16 to prevent leakage of lubricant from the end of the sleeve adjacent the bearing 21.

Outwardly of the bead 28 the axle is provided with a conical seat 30 for one side of the landing gear wheel generally indicated at 31. Outwardly of the conical seat 30 the axle is provided with a splined portion 32 received in a correspondingly splined aperture in the wheel hub 31. The splines on the axle mesh with the corresponding splines or grooves in the wheel aperture to prevent relative rotation between the axle and the wheel. Outwardly of the splined portion 32 the axle is provided with an externally screw threaded portion 33 upon which is threaded a conical nut 34 which forms a conical seat for the side of the wheel opposite the side engaged by the seat 30. By means of the conical seat 30 and the conical nut 34 the wheel 31 is accurately centered on the axle and maintained in a condition of exact concentricity with the axle. The nut 34 may be held against rotation by a suitable locking means 34 secured to the wheel 31 and engaging in serrations provided in the outer annular surface of the nut.

The wheel 31 is a two-part wheel formed of two similar parts 35 and 36 which have mutually contacting surfaces along a plane substantially perpendicular to the axis of wheel rotation and located midway of the width of the wheel. The two parts 35 and 36 each carry a tire flange, 37 and 38 respectively, and the hub portions within the tire flanges comprise outer and inner walls, the inner walls having their outer surfaces perpendicular to the axis of wheel rotation to constitute the meeting surfaces for the two parts of the wheel. If desired fasteners 39 may be connected through the inner walls to hold the two parts of the wheel together during assembly and these fasteners preferably have sufficient strength to retain the wheel in operative assembly when the tire 13 is fully inflated. The two wheel parts are firmly held together however by the clamping nut 34 and, with the fasteners 39 omitted the entire wheel and tire assembly may be disassembled at the time of removal of the wheel from the axle.

Apertures, as indicated at 40 and 41, are provided for access to the internally located fasteners 39. The outer face of the wheel is closed by a curved dust shield or hub cap 42 secured to the outer portion of the wheel by suitable spring clips in a desired or conventional manner.

The end of the axle opposite the wheel carrying end is provided with a splined portion 43 upon which is mounted an internally splined sleeve 44 having at its outer end a radial flange 45. The sleeve member 44 is clamped between a shoulder 46 on the axle and a nut 47 threaded onto the externally screw threaded end portions of the axle. The nut may be held in proper position by suitable means such as the lock washer 49 and lock nut 48.

The centrally apertured disc portion 50 of a brake drum, generally indicated at 51 and comprising the disc portion 50 and an annular cylindrical portion 52, is secured to the flange 45 by suitable fasteners such as the bolts 53. The brake drum will thus rotate with the wheel 31 and axle 23. A brake mechanism supporting disc or spider 54 is secured to the flange 20 of the bearing receiving cylindrical member 15 and supports the internal brake shoes 55 and 56 and the brake operating mechanism as indicated at 57. A hydraulic connection 58 leads to the hydraulic cylinder 57 by means of which the brake shoes are expanded into frictional contacts with the internal surface of the drum 51. The drum preferably carries a liner 59 of cast iron or other suitable frictional material.

A lubricant seal 60 is disposed between the external surface of the inner end of drum supporting sleeves 44 and the internal surface of the bearing sleeve or cylinder 15 adjacent the flange 20. This seal may comprise a ring of suitable resilient packing material secured by suitable means, such as the snap ring 61. Preferably an inner seal 62 is provided between the sleeve 44 and the cylindrical journal 15 and between the seal 60 and 62 the journal is vented, as indicated at 63, so that if any lubricant does leak past the seal 60 it will flow out of the journal outside of the brake mechanism and will not affect the brake mechanism in any way.

The brake end of the axle is covered by a cap 64 removably secured to the outer end of the sleeve 44. The axle is hollow or tubular throughout its length and the brake end of the axle bore may be threaded if desired to threadedly receive the stem portion of a jack pad 65 particularly illustrated in Fig. 4. This pad has a stem portion insertable into the hollow end of the axle and a flattened portion 66 beneath which the upper end of a jack or weighing scale may be inserted to lift the landing mechanism or apply the weight on the mechanism to a suitable scale when it is desired to weigh and balance the airplane. While it has been indicated that the stem of the pad and the bore in the axle may be correspondingly threaded to avoid any danger of slippage between the pad and the axle in operation these surfaces may be left plain if desired.

In order to lessen the hazard of landing with a flat or partially inflated tire and to minimize damage to the tire under such conditions, an emergency landing wheel 67 may be secured to the outer surface of the brake drum 51. This wheel would have a diameter less than the tire diameter by an amount such that it would not ordinarily touch the ground during landing or take-off operations with the tire inflated to the minimum safe air pressure and may conveniently comprise a metal ring or flange having a tire 68 of resilient material secured to its outer annular surface.

The cylindrical part of the brake drum is provided with suitable cooling fins 69 to dissipate the heat generated by braking action.

In the modified construction shown in Fig. 3 the wheel carrying arm 70 has a cylindrical journal member or bearing sleeve 71 integrally formed on its lower end opposite the end carrying the bracket 12 which secures the arm to the strut member 10. This cylindrical journal member 71 is provided internally thereof with two spaced apart shoulders 72 and 73 and with cylindrical internal portions which receive the outer bearings of antifriction roller bearings 74 and 75.

A tubular axle 76 is journalled in the bearings 74 and 75 and may be provided with a conical portion 77 which constitutes the inner race of the bearing 75. At its end adjacent conical portion 77 the axle is provided with a radial flange portion 78 to which is secured the disc member 79 of the brake drum, generally indicated at 80, having an annular or cylindrical portion 81 secured at one side of the outer portion of the disc 79. On the opposite side of the bearing 74 from the conical portion 77 the axle is provided with an externally splined portion 82 which receives the internally splined wheel hub, generally indicated at 83. A conical ring 84 surrounds the axle at the inner side of the wheel adjacently bearing 74 and a lubricant seal 85 is disposed between the ring 84 and the adjacent end of the bearing sleeve 71. At its other end the axle is provided with an externally threaded portion 86 upon which is threaded a conical nut 87 which bears against the corresponding edge of the portion of the wheel hub surrounding the axle receiving aperture in the hub.

When the nut 87 is tightened the wheel is forced toward the bearing 74 and the reaction on the axle tends to draw the axle in the opposite direction. Tightening of the nut 87 may thus serve to fix the wheel on the axle and preload the axle supporting bearings in a single operation.

The nut 87 is held against accidental rotation by a suitable locking device 88.

In this case the wheel is also preferably a two-part wheel although a unitary wheel may be used without in any way exceeding the scope of the invention. The parts of the wheel 83 are indicated at 89 and 90 and each has a tire retaining flange thereon, as indicated at 91 and 92 respectively. The wheel is preferably formed of a light metal casting such as aluminum or magnesium alloy and the apertured, internally splined hub portion 93 is connected to the rim portion by a suitable annular web, two spaced apart webs being shown for each half of the two part wheel. The inner webs abut along a plane perpendicular to the axis of wheel rotation at approximately the center of the width of the wheel and the two wheel parts are preferably secured together by suitable fasteners 93 access to which is provided by apertures 94 and 95 in the outer webs of the two wheel parts.

The outer end of the wheel is closed by a suitable curved cap or shield 96 and the inner side is closed by a shield 97 apertured to receive the corresponding end of the cylindrical journal member 71.

The brake end of the bearing sleeve formation 71 is provided with an external bead or flange 98 to which is secured a disc or spider 99 supporting the brake mechanism including the shoes 100 and 101 the abutment 102 and the brake actuating hydraulic cylinder 103.

The corresponding end of the journal 71 extends into the brake drum to an extent such that the bearing 74 is carried within the thickness of the brake mechanism to reduce the total thickness of the wheel and the brake so that the wheel and brake combination will fit into a convenient receptacle provided in the undersurface of an airplane wing and will not exceed the available thickness of the wings.

A lubricant seal 104 is provided between the end portion of the member 71 within the brake mechanism and a cylindrical extension on the axle to prevent leakage of lubricant from the axle bearing into the brake mechanism. Preferably a sheet metal shield 105 secured to the axle flange 78 by the fasteners 106, which secure the brake drum disc to the flange, extends across the space between the flange 78 and the end of the cylindrical member 71 and has a close fit on the end of the cylindrical member to receive any lubricant which may leak past the seal 104. Such lubricant leaking past the seal may be discharged through suitable vents 107 in the flange 78 so that none of it enters the brake mechanism to disadvantageously affect the operation of the brake.

In this arrangement a jack or scale pad 108 extends downwardly from the member 71 between the brake mechanism and the wheel but, if desired, this may be omitted and a removable jack pad similar in operation to that shown in Fig. 4 may be relied upon to provide a suitable contact area for the upper end of the jack. The axle is tubular and the brake end of the axle is covered by a removable cap 109 so that a pin type pad may be inserted without inconvenience.

In both forms of the invention the axle is rigidly supported intermediate its length and has no extensive overhang which would lead to bending or whipping of the axle while the landing wheel is on the ground and the brake mechanism is mounted on the axle in such a manner that there is no tendency for loads on the landing wheel to force the brake shoes out of alignment with the brake drums. The invention also provides a simplified arrangement which greatly facilitates servicing of both the wheels and the brakes and renders it possible to dismount a tire by simply removing the wheel retaining nut and separating the two parts of the wheel.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An aircraft landing gear including a single armed strut, a hollow axle journalled in said strut and projecting at opposite sides thereof; a landing wheel fixed on said axle at one side of said strut; a brake drum fixed on said axle at the opposite side of said strut; a brake shoe support fixed to said strut at the side thereof remote from said landing wheel and surrounding said axle; and brake shoes carried by said support and disposed within said drum.

2. In an aircraft landing gear, a single arm strut terminating in a substantially cylindrical bearing receiving member, an axle extending through and journalled in said member and projecting therefrom at each end of said member; a landing wheel secured on said axle at one end of said member against rotation relative to said axle; a brake drum secured on said axle at the opposite end of said member against rotation relative to said axle and a non-rotatable brake mechanism secured to the end portion of said member adjacent said brake drum; said wheel and said brake drum being disposed at opposite sides of said strut.

3. In an aircraft landing gear, a single arm wheel strut, a bearing receiving member on the lower end of said strut, spaced antifriction bearings in said bearing receiving member, an axle journalled in said bearings, a landing gear wheel secured on said axle at one side of said bearing receiving member against rotation relative to said axle; a brake drum secured on said axle at the opposite side of said bearing receiving member from said wheel against rotation relative to said axle; a brake mechanism support secured to said bearing receiving member at the end thereof adjacent said brake drum, brake mechanism carried by said support within said drum, means on said axle securing said brake drum and said wheel thereon, and means on said axle operative to preload said spaced antifriction bearings to maintain said axle concentric relative to said bearing receiving member.

4. In an aircraft landing gear, a wheel supporting arm, a bearing receiving member at the wheel connected end, of said arm, an axle journalled in said bearing receiving member and projecting therefrom at each end of said member, a landing wheel secured on the portion of said axle projecting from one end of said member against rotation relative to said axle, a tire on said wheel, a brake drum secured on the portion of said axle projecting from the opposite end of said member against rotation relative to said axle, and a nonrotatable brake mechanism secured to the end portion of said member adjacent to said brake drum, said wheel supporting arm being curved around said tire and supporting said axle closely adjacent to one side of said wheel.

5. In an aircraft landing gear a wheel supporting arm having a bearing receiving member at the wheel connected end thereof, an axle journalled in said member and projecting therefrom at each end of said member, said axle having at one side of said member a longitudinally splined portion having a shoulder at one end and an externally threaded portion at the other end thereof, a two part wheel mounted on the splined portion of said axle having internal grooves for said axle splines, a nut on said threaded axle portion clamping the two parts of said wheel together and retaining said wheel on said axle, a brake drum secured on the other end portion of said axle against rotation relative thereto, and a non-rotatable brake mechanism secured to the end portion of said member adjacent said brake drum.

6. In an aircraft landing gear a wheel supporting arm, a bearing receiving member at the wheel connected end of said arm, a rotatable axle journalled in and extending through said bearing receiving member, a pair of beveled annular abutments surrounding said axle at locations spaced apart therealong, at least one of said abutments being screw threaded onto said axle for movements longitudinally of the axle, a two part wheel hub mounted on said axle between said abutments with said abutments holding the two parts of said wheel hub together, and a spline connection between said axle and at least one of the two parts of said wheel hub.

7. In an aircraft landing gear a wheel supporting arm, a bearing receiving member at the wheel connected end of said arm, a rotatable axle journalled in and extending through said bearing receiving member, a pair of beveled annular abutments surrounding said axle at locations spaced apart therealong, at least one of said abutments being screw threaded onto said axle for movement longitudinally of the axle, a two part wheel hub mounted on said axle between said abutments with said abutments holding the two parts of said wheel hub together, a spline connection between said axle and at least one of the two parts of said wheel hub, and means carried by said wheel also securing the two parts of the wheel together.

8. In an aircraft landing gear unit an arm, a cylindrical member at one end of said arm, antifriction bearings mounted in spaced apart relationship in said member, an axle removably journalled in said bearings, a brake drum removably secured on said axle at one side of said arm, a wheel removably secured on said axle at the opposite side of said arm, and brake mechanism mounted on said cylindrical member and disposed within said brake drum, said brake drum and said wheel being removable from said axle independently of each other.

9. An aircraft landing gear comprising a wheel carrying arm having a bearing receiving member at the wheel connected end thereof, antifriction bearings mounted in spaced apart relationship in said bearing receiving member, an axle journalled in said bearings, a wheel fixed on said axle at one side of said arm, a flanged sleeve fixed on said axle at the other side of said arm, a brake drum fixed to the end of said sleeve remote from said arm, a brake mechanism support fixed to said bearing receiving member at the other side of said arm member, and brake mechanism carried by said support and disposed within said brake drum.

10. An aircraft landing gear comprising an arm, a bearing member at one end of said arm, an axle journalled in said bearing member and having at one end an integral annular flange disposed at one side of said arm, a landing wheel fixed on said axle at the other side of said arm, a brake drum secured to said axle flange concentrically of said axle, an external flange on said bearing member at said one side of said arm, a brake mechanism support secured to said bearing member flange, and brake mechanism carried by said support and disposed within said brake drum.

11. An aircraft landing gear comprising an arm, a bearing member at one end of said arm, a pair of antifriction bearings mounted in said bearing member one in each end portion thereof, an axle journalled in said bearings, a wheel fixed on said axle at one side of said arm, a brake drum fixed on said axle at the other side of said arm, a brake mechanism support carried by said bearing member at said other side of said arm, and brake mechanism carried by said support and disposed within said drum, one of said antifriction bearings being disposed within said brake drum.

12. An aircraft landing gear mechanism comprising an arm, a bearing receiving member at one end of said arm, a pair of spaced antifriction bearings in said member, an axle journalled in said bearings and extending from the opposite ends of said member, a wheel fixed on said axle at one side of said arm, a brake secured on said axle at the other side of said arm, and means screw threaded onto said axle to retain said wheel on said axle and preload said antifriction bearings.

References Cited in the file of this patent

UNITED STATES PATENTS

| | | |
|---|---|---|
| 975,453 | Perrins | Nov. 15, 1910 |
| 1,340,483 | Guillemet | May 18, 1920 |
| 1,766,074 | Hiers | June 24, 1930 |
| 1,810,054 | Miller | June 16, 1931 |
| 2,272,962 | Tatter et al. | Feb. 10, 1942 |
| 2,367,825 | Shaw | Jan. 23, 1945 |
| 2,404,018 | Yaggy | July 16, 1946 |
| 2,410,133 | Spatta | Oct. 29, 1946 |
| 2,533,869 | Barfus | Dec. 12, 1950 |
| 2,602,612 | Zimmerman et al. | July 8, 1952 |
| 2,616,641 | Gagen | Nov. 4, 1952 |
| 2,707,604 | Dowty | May 3, 1955 |

FOREIGN PATENTS

| | | |
|---|---|---|
| 1,051,071 | France | Sept. 9, 1953 |